May 2, 1939.　　　　J. L. HEROLD　　　　2,156,497
DRIVING DEVICE AND MEANS FOR CONTROLLING THE FLOW OF FLUIDS THEREIN
Filed May 26, 1937　　　2 Sheets-Sheet 2
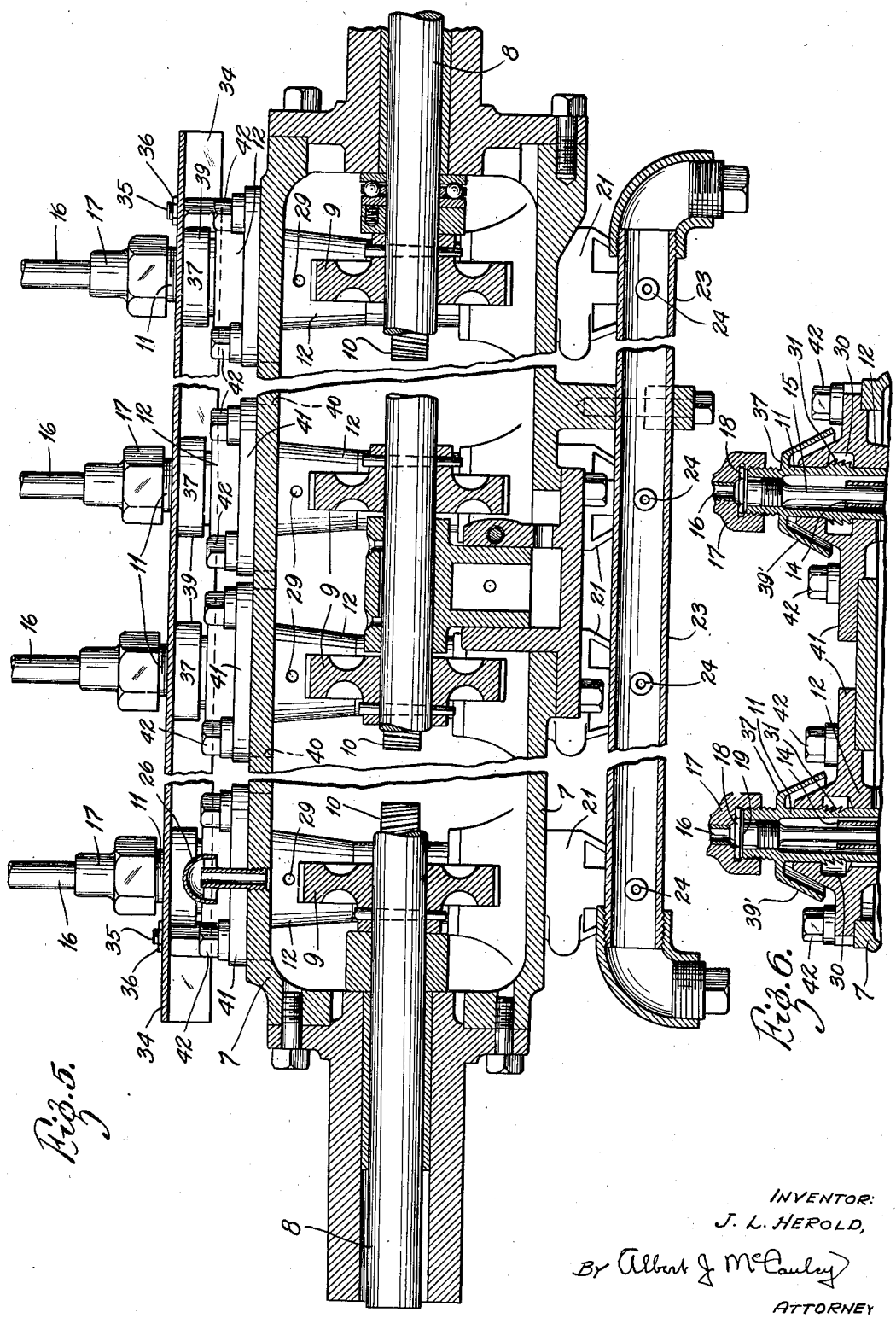
INVENTOR:
J. L. HEROLD,
By Albert J. McCauley
ATTORNEY Patented May 2, 1939

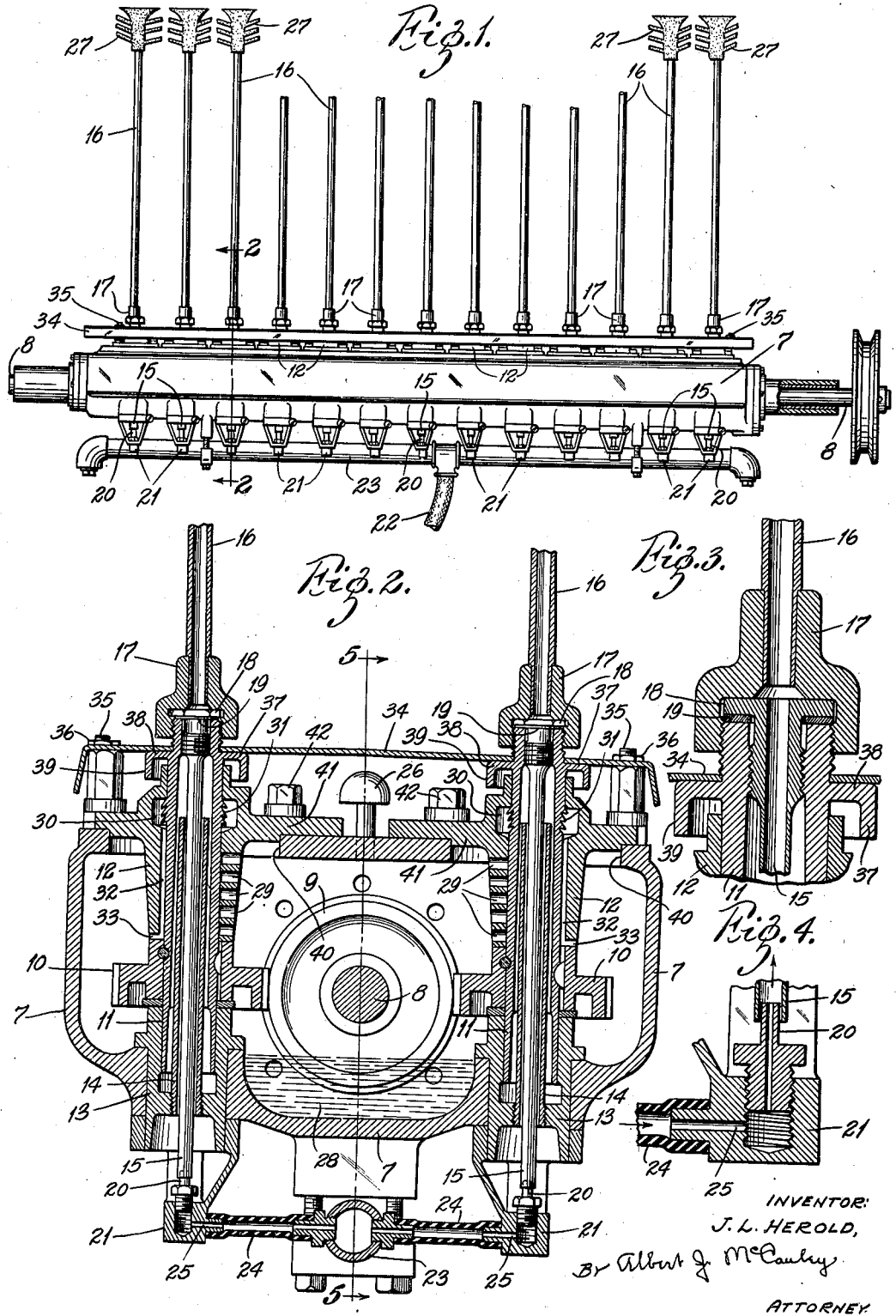

2,156,497

UNITED STATES PATENT OFFICE 2,156,497

DRIVING DEVICE AND MEANS FOR CONTROLLING THE FLOW OF FLUIDS THEREIN

James L. Herold, St. Louis, Mo., assignor to Barry-Wehmiller Machinery Company, St. Louis, Mo., a corporation of Missouri Application May 26, 1937, Serial No. 144,874

4 Claims. (Cl. 15—59)

This invention relates to driving devices and means for controlling the flow of fluids therein.

In the delivery of fluid to rotating conductors, it is customary to employ stuffing boxes, or the like, to confine and prevent leakage of the fluid under pressure at the junctions of stationary and rotating conductors. Furthermore, cases, or housings, containing driving mechanism are ordinarily equipped with stuffing boxes to prevent leakage of lubricant around the driven members which extend from the enclosed driving mechanism. Aside from any loss of power due to friction at the compressed packing, such stuffing boxes are a source of trouble and uncertainty, requiring more or less frequent adjustments, and they are not very efficient in preventing undesirable leakage.

One of the objects of the invention is to produce a simple means for transmitting fluid under pressure to a rotating conductor, without incurring the necessity of using a stuffing box, or the like, at the point where the fluid is delivered to the rotating conductor. In one form of the invention this is accomplished through the medium of an injector nozzle extending into a rotating tube, said tube being rotated independently of the nozzle, and the fluid under pressure being discharged from the nozzle and through the tube, without requiring a stuffing box, or the like, to prevent leakage at the point where the fluid is delivered to the rotating tube.

Another feature of the invention is shown in a case, or housing, containing driving mechanism, and having one or more openings for a rotary member which extends from the case, or housing, the object of this feature being to prevent leakage of lubricant from such openings, without the necessity of using stuffing boxes, or the like.

Actual commercial use of the novel devices herein disclosed has shown that they effectively perform their functions, without the aid of frictional material in stuffing boxes; and in the preferred form of the invention the desired results are accomplished without resorting to frictional devices in the means for preventing leakage.

A further object of the invention is to produce a simple and efficient means for preventing the admission of water, or other liquid, into the case or bearing containing the lubricated driving device.

With the foregoing and other objects in view, the invention comprises the novel construction, combination and arrangement of parts hereinafter more specifically described and shown in the accompanying drawings, which illustrate one form of the invention. However, it is to be understood that the invention comprehends changes, variations and modifications within the scope of the claims hereunto appended.

Fig. 1 is a side view of a device embodying features of this invention, the upper end portions of some of the rotary fluid conductors being broken away.

Fig. 2 is a section on a larger scale taken approximately on the line 2—2 in Fig. 1.

Fig. 3 is an enlarged section showing the upper end portion of one of the tubular driving shafts, and details associated therewith.

Fig. 4 is an enlarged section showing one of the injector nozzles extending into an end portion of a rotary tube.

Fig. 5 is a section taken approximately on the line 5—5 in Fig. 2, with intermediate portions of the apparatus broken away.

Fig. 6 is a fragmentary section showing flaring baffles at the upper ends of tubular driving shafts.

The device herein shown to illustrate one form of the invention comprises an elongated case, or housing, 7 containing driving mechanism which may include a shaft 8 rotated through the medium of any suitable source of power outside of the case, spiral gears 9 fixed to said shaft and meshing with spiral gears 10 fixed to tubular driving shafts 11, the latter being rotatably mounted in bearings 12 at the upper portion of the gear case. The lower ends of said tubular shafts 11 may be rotatably mounted in bushings 13 secured in openings which extend through the gear case. Each bushing 13 is provided with a threaded opening to receive the threaded lower end of a stand pipe 14 which extends upwardly a substantial distance above the bottom of the gear case. As shown in Fig. 2, each stand pipe may extend to a point near the top of the gear case, so as to lie within the adjacent tubular drive shaft 11.

The rotary elements driven by each tubular drive shaft 11 may include a tube, or stem, 15 surrounded by and secured to said drive shaft 11, as will be hereafter described, and a delivery tube 16 extending upwardly from the top of said drive shaft 11, the bottom of said delivery tube being provided with a coupling 17 screwed onto the upper end of said drive shaft 11. As shown most clearly in Figures 2 and 3, the upper end portion of the tube 15 may be screwed into the drive shaft 11 and provided with a non-circular flange 18 engaging a gasket 19 seated on the top of said drive shaft 11.

By referring to Figures 2 and 3 it will be noted that the delivery tube 16 forms a continuation of the lower tube 15, and that both of these tubes are secured to the rotary drive shaft 11. To provide for the delivery of liquid through the rotary tubes 15 and 16, injector nozzles 20 may extend into the lower ends of the tubes 15. As shown in Figures 2 and 4, each of said nozzles may be separated from the adjacent tube 15, to permit free rotation of the tube independently of the nozzle. The several nozzles 20 may be screwed into holders 21 carried by the gear case.

The means for delivering liquid under pressure to the nozzles 20 may include a supply tube 22 (Fig. 1) connected to a long pipe 23 having branches 24 (Fig. 2) leading to passageways 25 in the several nozzle-holders 21, so as to deliver the liquid under pressure to the nozzles 20. The several streams of liquid are thus forcibly discharged from the restricted passageways in the nozzles 20 and into the rotating tubes 15. Commercial use of this device has shown that the streams of liquid can be thus forcibly projected through the rotating injector tubes 15 and thence through the elongated delivery tubes 16. This result has been successfully accomplished without using stuffing boxes, or the like, at the intake ends of the rotating tubes, and without any frictional elements to prevent leakage at said ends, the injector nozzles 20 being separated from the tubes 15 to permit free rotation of said tubes.

In considering the action of the injector, it will be important to observe that a jet of liquid is forcibly discharged from each nozzle 20 at a high velocity and in an upward direction, onto the rising column of liquid in the rotary injector tube 15. The pressure of this forcible jet is great enough to lift the column of liquid, and it appears that the rising jet flares outwardly after leaving the nozzle. Any liquid tending to move downwardly in the rotary tube 15 is opposed by the force of this rising jet, so the high pressure and high velocity of the rising jet results in the desired discharge through the vertical delivery tube 16. Of course, a very large open space around the nozzle would result in excessive leakage, and conversely, a very tight fit at the nozzle and rotary tube would result in excessive friction. To overcome both of these objections, the space between the nozzle and tube is very slight, and commercial use of the invention has shown that it is an entirely feasible means for eliminating the trouble, expense and uncertainty heretofore involved in the use of numerous stuffing boxes which require frequent adjustment as well as a very substantial degree of power to overcome the friction at the tight packing. It is to be understood, however, that in assembling the long rows of stationary nozzles and alining them with the rotary injector tubes 15, some of the tubes may frictionally engage the nozzles, due to slight inaccuracies in the centering; and when in actual use, some of the liquid will enter into the spaces around the nozzles. However, such liquid is merely a film around the nozzles, where it serves as a lubricant for contacting portions of the tubes and nozzles, and the resultant leakage is not great enough to require stuffing boxes around said tubes. I have described the theory of operation as it now appears to me, and while there may be some uncertainty in this theory, the actual commercial use of the invention has shown that it accomplishes the results and advantages herein set forth.

A breather 26 may be secured to the case 7, as shown at the upper portions of Figures 2 and 5.

In one form of the invention, brushing devices 27 (Fig. 1) are secured to the upper ends of the delivery tubes 16, and water or other cleansing fluid may be transmitted through and discharged from the upper ends of said tubes 16 to provide a means for washing and brushing bottles and other articles. However, it is to be understood that the invention is not limited to a device of this kind.

Attention is now directed to the means for lubricating the driving mechanism in the case 7, and the means for preventing leakage of lubricant from said case.

As shown in Fig. 2, the case 7 contains a body of lubricating oil 28 in the course of the rotating gears 9, and each bearing 12 has inlet ports 29 to receive the splashed lubricant, which flows between the bearing and the outer face of the tubular drive shaft 11. Some of this lubricating oil will rise along the peripheral face of the drive shaft 11, and some will flow downwardly and drop from the bottom of said shaft.

The means for preventing leakage of lubricant at the upper portion of each shaft 11 (Fig. 2) preferably comprises an annular lubricant chamber 30 surrounding a peripheral portion of said shaft 11, and a baffle device 31 formed on said peripheral portion. Said baffle device 31 may be in the form of annular ribs inclined downwardly to retard the rising oil, and since these ribs are carried by a rotating shaft, they provide a centrifugal throwing device whereby the rising oil is thrown from the shaft and into the lubricant chamber 30. A return passage 32 for the oil (Fig. 2) extends downwardly from the lubricant chamber 30 to a discharge port 33, so as to permit return of the oil discharged into said chamber. However, the passage 32 may be formed by a groove in the inner face of the bearing 12, so as to distribute this oil along the peripheral face of the shaft 11, and thereby more effectively lubricate the shaft and bearing. It will now be understood that this device prevents escape of lubricant at the upper portion of the case 7, where the shaft 11 extends through said case, without requiring the use of a stuffing box, or the like, to prevent leakage.

The lubricant chambers 30 can be conveniently formed in the bearings 12 to provide traps for the lubricant which might otherwise be discharged from the upper ends of the bearings. As shown in Fig. 2, each of the lubricant chambers 30 preferably lies between the lubricant inlets 29 and the upper end of the bearing.

The means for preventing leakage of lubricant from the lower portion of the case 7, where the rotary member 15 extends from said case, is another frictionless device including the fixed stand pipe 14 having its lower end secured to an element of the case 7 to prevent leakage at said lower end. This stand pipe surrounds the rotary member 15, and it is preferably surrounded by but separated from the tubular shaft 11. If desired, the inner face of said tubular shaft 11 may be enlarged at the bottom and tapered, as shown in Fig. 2, to provide a decrease in the restricted space wherein the oil may rise between the outer face of the stand pipe 14 and the inner face of said tubular shaft 11. The oil falling from the lower end of the tubular shaft 11 will form a pool of limited height in the bushing 13 to aid in lubricating the lower portion of said shaft 11, but this oil is confined by the stand pipe 14, and it will not rise to the upper end of said stand pipe.

In addition to preventing leakage of fluid from the gear case 7, the apparatus herein shown includes devices for preventing the admission of water, or other liquid, through the openings formed in the top of the case, where the shafts extend through said case. This is particularly desirable under conditions wherein liquid is dropped or splashed onto the outer face of the case. For example, if the driving mechanism is employed to rotate tubular spindles 16 which discharge cleansing liquid into inverted bottles, or the like, the used liquid will drop toward the case 7, and such liquid should be excluded from the interior of the case.

A shield 34 may be located over the case 7 as shown in Figures 1 and 5, said shield being approximately coextensive with the top of the case and secured thereto at various points by means of screws 35 extending upwardly from the case, and nuts 36 applied to said screws. This shield will receive liquid falling toward the case 7, but it has holes to receive the rotary shafts 11, and some of the liquid will pass through said holes.

The shafts 11 extend from openings at the top of the case 7 formed through the bearings 12, and rotary baffles 37 are located over these openings to receive and discharge liquid moving toward said openings. Each of these baffles 37 is preferably in the form of a cap having a portion 38 immediately above the opening at the top of one of the bearings 12, and an annular downturned portion 39 surrounding said opening. Each baffle 37 is preferably carried by one of the rotary shafts 11, so as to provide a centrifugal device whereby fluid delivered to the baffle is thrown away from the adjacent opening in the bearing. In Fig. 2, the annular downturned portions 39 of the baffles 37 are cylindrical, but a more efficient centrifugal device is shown in Fig. 6, wherein the downturned portions 39' are flared outwardly from the closed upper portions of the baffles, to provide a centrifugal throwing action at the inner faces of the baffles, as well as at the outer faces.

For convenience in assembling and removing various elements of the apparatus, openings 40 (Fig. 2) are formed in the top of the gear case, and these openings are larger than the gears 10. Each of openings is normally closed by flange 41 extending from a bearing 12 and secured to the case by means of screws 42. Since the bearing 12, gear 10, drive shaft 11 and driven tube 15 are secured together, all of these elements can be removed as a unit through one of the openings 40, and the adjacent stand pipe 14 as well as the bushing 13 can then be removed through the same opening 40.

I claim:

1. In a device of the kind described, a case provided with a tubular driving shaft, a stand pipe surrounded by said tubular shaft and having its lower end secured to said case to prevent leakage at said lower end, a tubular fluid conductor extending through said stand pipe and secured to said tubular driving shaft at a point above the stand pipe so as to rotate with said driving shaft, an injector nozzle extending into the lower end of said fluid conductor, and means for transmitting fluid to said injector nozzle.

2. In a device of the kind described, a tubular conductor provided with a brush at its upper end, an injector nozzle extending into the lower end of said tubular conductor, means for rotating said tubular conductor and brush independently of said nozzle, said injector nozzle being spaced from the conductor to permit free rotation of the tubular conductor independently of said nozzle, and means for transmitting liquid to said nozzle.

3. In a device of the kind described, a tubular conductor provided with a brush at one end, an injector nozzle extending into the other end of said tubular conductor, means for rotating said tubular conductor and brush independently of said nozzle, said injector nozzle being of a smaller diameter than the internal diameter of said tubular conductor to permit free rotation of the tubular conductor independently of said nozzle, and means for transmitting liquid to said nozzle.

4. In a device of the kind described, a tubular conductor provided with a brush at its upper end, an injector nozzle extending into the lower end of said tubular conductor, means for rotating said tubular conductor and brush independently of said nozzle, said injector nozzle being of a smaller diameter than the internal diameter of said tubular conductor and separated from the conductor to permit free rotation of said conductor independently of said nozzle, and means for transmitting liquid to said nozzle.

JAMES L. HEROLD.